L. MEYER (NÉE WOLF) AND R. SCHIFF.
COOKING APPARATUS.
APPLICATION FILED MAY 27, 1916.
1,341,960.
Patented June 1, 1920.
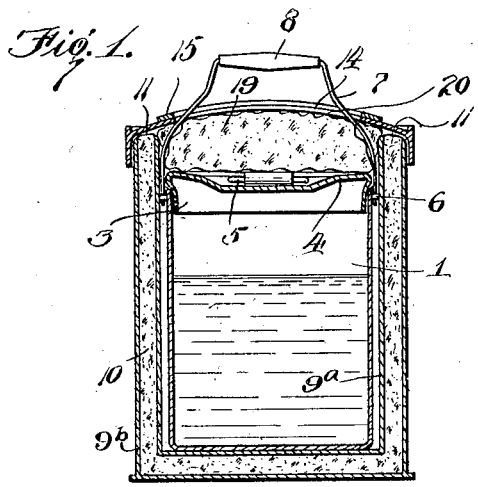
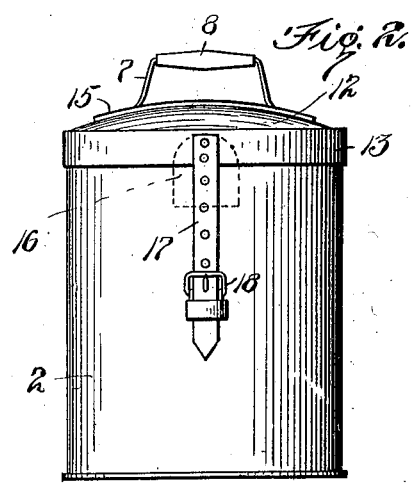
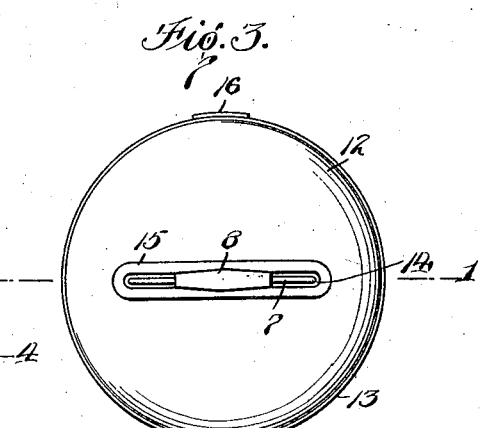
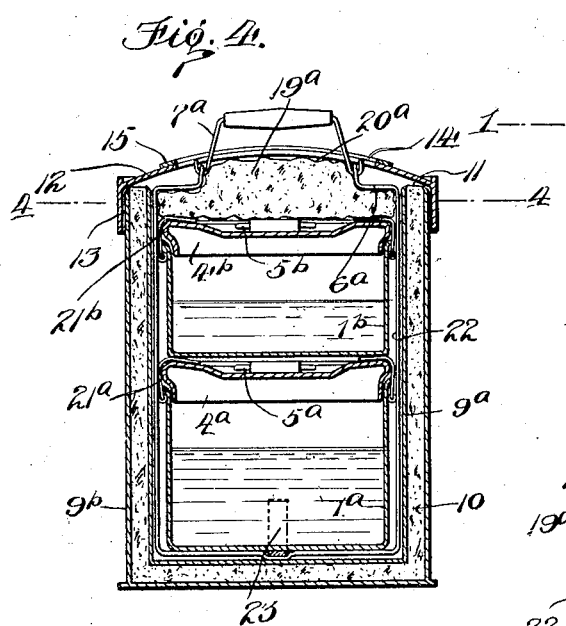
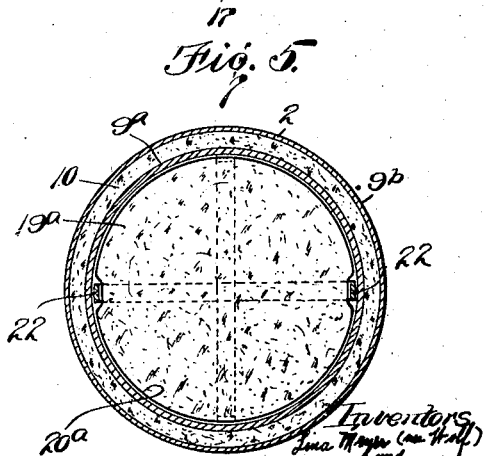

UNITED STATES PATENT OFFICE.

LINA MEYER, NÉE WOLF, AND ROBERT SCHIFF, OF FRANKFORT-ON-THE-MAIN, GERMANY, ASSIGNORS TO THE FIRM H. HIRSCHFELD SEN., OF FRANKFORT-ON-THE-MAIN, GERMANY.

COOKING APPARATUS.

1,341,960. Specification of Letters Patent. Patented June 1, 1920.

Application filed May 27, 1916. Serial No. 100,395.

*To all whom it may concern:*

Be it known that we, LINA MEYER, née WOLF, and ROBERT SCHIFF, both of 18 Hanauerlandstrasse, Frankfort-on-the-Main, Kingdom of Prussia, Germany, have invented certain new and useful Improvements in Cooking Apparatus, of which the following is a specification.

Our invention relates to cooking apparatus and more especially to the kind of apparatus designed to receive the partly cooked food and to bring the cooking to an end without any further heating from without. The particular object of our invention is an apparatus of this kind which can be easily carried about, thus being exceedingly well adapted for tourists, out-door workers and soldiers.

The special kind of cooking apparatus to be described hereinafter is a combination of at least one receptacle adapted to directly receive the solid or liquid food, and a heat insulating envelop, the receptacle being provided with a cover having a heat insulating cushion arranged on top of it, a clip for carrying the apparatus projecting through the device for closing the heat insulating envelop. In order to lessen the weight, the stiffening walls of the envelop instead of being made of metal, are made of stiff canvas, card-board or the like and the whole is covered with a water-tight fabric in order to allow the apparatus to be carried about in the rain without any danger.

In the drawings accompanying the specification and forming part thereof two different modifications of a cylindrical cooking apparatus according to our invention are represented.

Figure 1 is a vertical section on the line 1—1 of Fig. 3;

Fig. 2 is a side view,

Fig. 3 is a plan view of one modification.

Fig. 4 is a vertical section of the second modification, and

Fig. 5 is a cross-section on the line 4—4 of Fig. 4.

Referring to Figs. 1 to 3, 1 is the removable food receptacle, 2 is the heat insulating envelop, both of circular section. The pot-like receptacle 1 is provided with an air-tight cover 3 presenting a hollow central part 4 and a folding handle 5 adapted to enter said hollow part and serving for putting the cover in place and for removing it. Another folding handle or clip 7 made of wire is pivoted to pins 6 fixed on the wall of the receptacle 1, a movable cylindrical grip 8 being provided on its middle part. The heat insulating envelop 2 consists of two stiff cylinders $9^a$ and $9^b$, one surrounding the other, said cylinders being made of stiff canvas or of card-board covered with canvas, the interstice between the cylinders being filled with wood-wool 10 or another poor heat conductor. The upper edges of the cylinders are connected with each other by a ring 11 of canvas or any other water-tight fabric. The envelop is covered with a preferably convex cover 12 provided with a projecting flange 13 made of canvas and with a central slot 14 stiffened by aid of leather cord 15 and allowing the clip 7 to pass. The cover 12, 13 is connected at its back with the envelop 2 by a leather flap 16 acting like a hinge-joint, and a strap 17 fastened to the cover diametrically opposite the flap 16 and buckle 18 fastened to the envelop serve as the means for locking the envelop. Between the cover 4 and cover 12 there is arranged a cushion 20 of cloth filled with wood-wool or any other poor heat conductor, said cushion owing to its elasticity completely filling the space above the receptacle 1 and being somewhat compressed by clip 7 in two diametrically opposite places.

In the modification shown in Figs. 4 and 5 two separate food receptacles $1^a$ and $1^b$ of equal or different height provided with covers $4^a$ and $4^b$ and with folding handles $5^a$ and $5^b$ respectively are arranged within the inner cylinder $9^a$ of envelop 2, one on top of the other. The heat insulating envelop 2 consists of two cylinders $9^a$ and $9^b$ and the upper edges of these cylinders are connected by a ring 11. The envelop is covered with a preferably convex cover 12 provided with a projecting flange 13 having a central slot 14 stiffened by a leather cord 15 allowing the clip 7 to pass. The covers are pressed down upon their respective receptacles by means of grippers $21^a$ and $21^b$. The receptacles are held in position by two U-shaped band-iron clips crossing each other, a high clip 22 and a low clip 23. The upper ends 6ª of the upright arms of clip 22 are perforated to form eyes to receive the hook-shaped ends of the carrying handle 7ª.

On the top of the uppermost receptacle 1ᵇ a cushion 20ª filled with a poor heat conductor such as wood-wool 19ª is arranged, said cushion serving as an elastic member between the covers 4ᵇ and 12.

We claim:—

In a portable cooking apparatus, an outer envelop, an inner cylinder enveloped thereby, heat insulating material interposed between said envelop and cylinder, a number of separate, superposed food receptacles, a cover on each of said receptacles, foldable handles on said covers, retaining means for holding said covers on the receptacles, two U-shaped clips for holding the receptacles in their respective positions, eyes on the upper ends of one of said clips, and insulating cushions on top of the upper receptacle, and an outer handle hooked into the eyes of one of said clips.

In testimony whereof we affix our signatures in presence of two witnesses.

LINA MEYER, GEB. WOLF.
ROBERT SCHIFF.